Dec. 4, 1956  J. C. JANSMA  2,772,782
LIQUID THERMAL DIFFUSION APPARATUS AND METHOD
Filed April 28, 1953
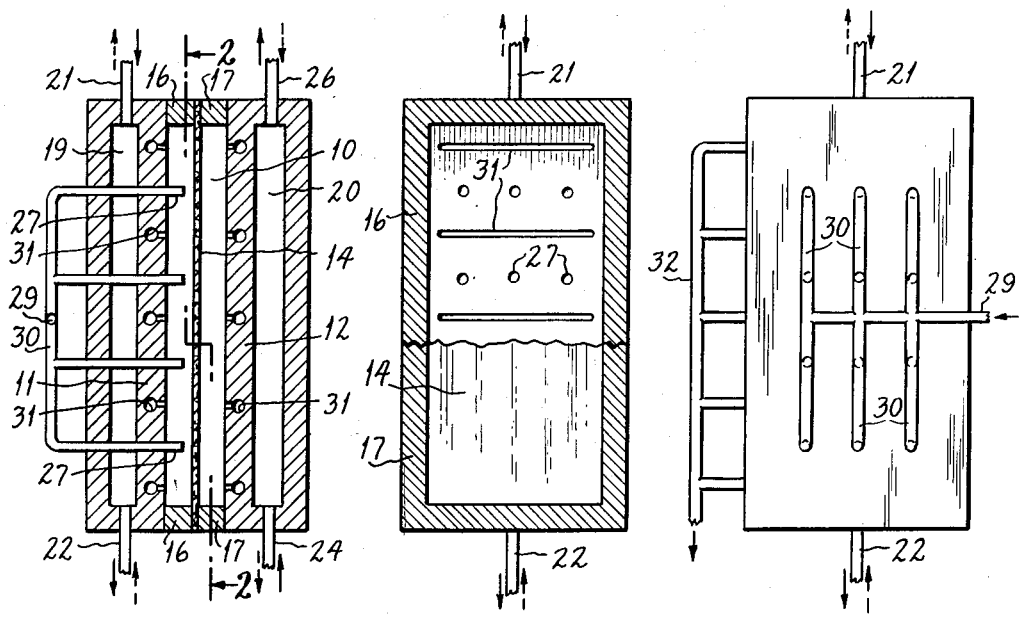
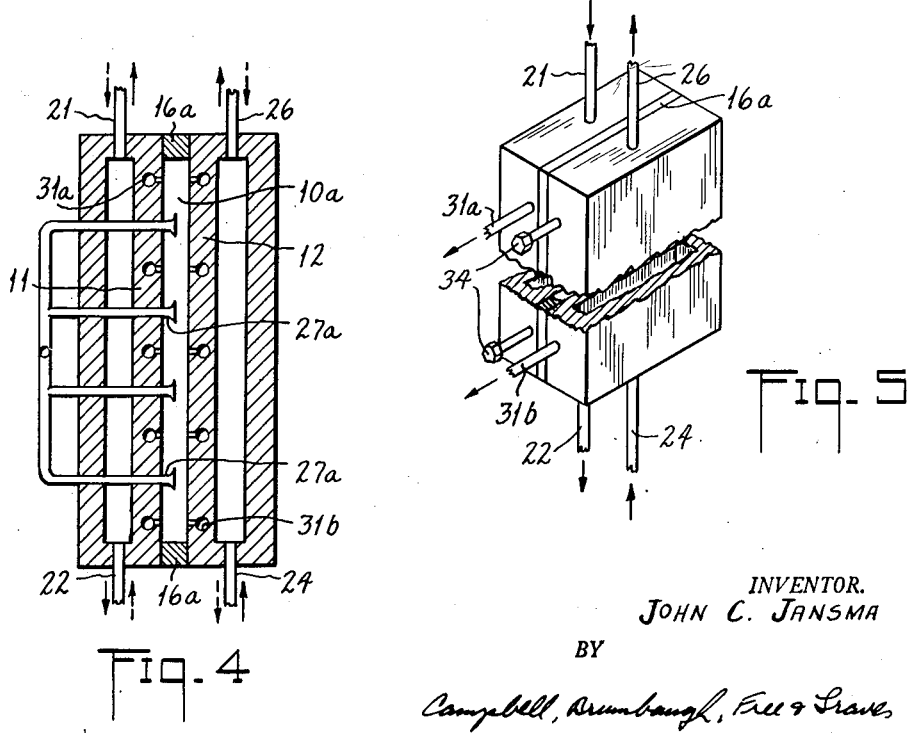
INVENTOR.
JOHN C. JANSMA
BY
*Campbell, Drumbaugh, Free & Graves,*
ATTORNEYS

2,772,782
LIQUID THERMAL DIFFUSION APPARATUS AND METHOD

John C. Jansma, Maple Heights, Ohio, assignor to The Standard Oil Company, Cleveland, Ohio, a corporation of Ohio Application April 28, 1953, Serial No. 351,528

6 Claims. (Cl. 210—52.5)

The present invention relates to improvements in apparatus for separating dissimilar materials in a liquid mixture by continuous liquid thermal diffusion and to an improved continuous liquid thermal diffusion process.

The art of separating liquid mixtures into two or more liquid fractions, e. g., a first fraction enriched in a component of the liquid mixture and a second fraction impoverished in said component, by subjecting the liquid mixture to thermal diffusion dates back almost ninety years but remained largely a laboratory curiosity because of the extremely poor separations obtained. In recent years, however, interest has been revived in liquid thermal diffusion as a means of resolving a liquid mixture into two or more dissimilar fractions that are relatively enriched and impoverished in components that are extremely difficult, if not impossible, to separate by other means and to carry out such separations on a scale that would be commercially feasible.

Liquid thermal diffusion is carried out in apparatus consisting essentially of two closely spaced walls defining a separation chamber as described in U. S. Patents 2,541,069–71, granted February 13, 1951, to Jones and Hughes, the spacing between the walls being of the order of about 0.15 inch or less, preferably between about 0.02 and about 0.06 inch. One of the opposed, chamber-forming walls is maintained at a temperature higher than the other in order to impose a temperature gradient across the liquid in the separation chamber. It is believed that energy is imparted to the molecules in the liquid from the wall which is at the higher temperature, referred to herein as the "hot wall" or "relatively hot wall" and that this energy is reflected in a tendency of the molecules to move toward the opposite "cold wall" or "relatively cold wall." It is also believed that the tendency of a given molecule to move from one wall to the other is dependent, in part at least, upon its composition, shape, or both. It has been observed, for example, that compact molecules, such as those of the ring type, of a given molecular weight tend to move more readily from adjacent the hot wall than do molecules of extended configuration such as long chain aliphatics, of about equal molecular weight.

The present invention is based upon a conclusion that since the liquid accumulating adjacent the hot and cold walls of a thermal diffusion separation chamber is most enriched and impoverished, respectively, in a given component of the liquid mixture, the liquid approximately midway between the hot and cold walls most closely resembles the liquid mixture introduced for processing.

The liquid thermal diffusion apparatus of the present invention in essence comprises an elongated separation chamber formed by closely spaced, parallel, liquid-impervious, opposed walls, means for relatively heating one of the walls and cooling the other of the walls to maintain a temperature gradient across the separation chamber, one or more inlets for introducing a liquid mixture into the chamber at a location or at locations intermediate the chamber-forming walls, and at least two, preferably a plurality of outlets spaced from the inlet or inlets for withdrawing liquid fractions from the separation chamber at locations closely adjacent the chamber-forming walls.

In the preferred embodiment of the apparatus of the invention the separation chamber is provided with a liquid-permeable membrane extending longitudinally through the chamber in much the same manner as described in application Serial No. 218,944, of Jones and Milberger, filed April 3, 1951, and assigned to the same assignee as the present application, now Patent No. 2,712,386, dated July 5, 1955, and a plurality of spaced inlets terminating within the separation chamber at locations closer to the membrane than to either of the chamber-forming walls.

The improvement in the continuous liquid thermal diffusion method contemplated by the present invention consists essentially in continuously introducing the liquid mixture to be subjected to thermal diffusion into the separation chamber at spaced locations intermediate the chamber-forming walls, i. e., into the portion of the chamber wherein the liquid most closely resembles the initial liquid mixture, and continuously withdrawing, at two or more and preferably a plurality of locations spaced from the locations of introduction, liquid fractions accumulating adjacent the chamber-forming walls. When the method is carried out with thermal diffusion apparatus having a liquid-permeable membrane in the separation chamber, the liquid mixture is, in accordance with the invention, introduced into the separation chamber at locations closer to the permeable membrane than to the chamber-forming walls.

The apparatus of the invention can be utilized with the chamber-forming walls in vertical or horizontal positions, it being preferred in most instances when the walls are in a horizontal position, that the hot wall be above the cold wall. When the chamber-forming walls, and therefore the separation chamber as well, are in substantially a horizontal position, it is particularly desirable that a plurality of outlets be provided for removing liquid fractions accumulating adjacent each of the walls. When on the other hand the separation chamber is in a substantially vertical position, it may be desirable to utilize only one or a few outlets in the hot wall at the upper end of the chamber and only one or a few outlets in the cold wall in the lower portion of the chamber. Any outlets in the walls that are not used may conveniently be neutralized for minimum interference with the separation by insertion into the outlets of closures such as described in my copending application Serial No. 351,527, filed April 28, 1953.

One of the advantages of the apparatus and method of this invention is that the introduction of the liquid mixture into the separation chamber at locations or points intermediate the chamber-forming walls reduces to a minimum the dilution of enriched or impoverished fractions that accumulate adjacent the relatively hot and cold walls. Another important advantage of the embodiment wherein a plurality of inlets are provided is that the rate at which the liquid mixture is introduced into the separation chamber through any one inlet is but a fraction of the total feed rate and that consequently there is a minimum disruption of the flow of liquid and molecular movement across the separation chamber by the liquid mixture entering the chamber.

These and other advantages, as well as the utility of the apparatus and method of the invention, will become more apparent from the following detailed description made with reference to the accompanying drawing wherein:

Figure 1 is a schematic end view in cross-section through one preferred embodiment of the apparatus;

Figure 2 is a view in cross-section taken on section line 2—2 of Figure 1;

Figure 3 is a view in elevation showing the left side of the apparatus illustrated in Figure 1;

Figure 4 is a view in cross-section, similar to Figure 1, of another embodiment of the apparatus; and Figure 5 is a view in perspective of a modified apparatus similar to that illustrated in Figure 4.

The apparatus illustrated schematically in Figures 1 to 3 consists essentially of an elongated separation chamber 10 formed by closely spaced, parallel, liquid-impervious and opposed walls 11 and 12 and containing a liquid-permeable membrane 14 that extends longitudinally through the chamber 10 and is positioned between the walls 11 and 12 by gaskets 16 and 17. The walls 11 and 12 are provided with any suitable means for relatively heating and cooling them, such as jackets 19 and 20 through which heating and cooling media may be circulated by way of lines 21, 22, 24 and 26.

A plurality of inlets 27 terminating in the separation chamber 10 intermediate the walls 11 and 12 and preferably at locations closer to the membrane 14 than either of the walls 11 and 12 are connected to a source of liquid mixture to be subjected to thermal diffusion by any suitable means such as header 29 and branch lines 30. A plurality of outlets 31, which may be constructed in the manner described in application Serial No. 273,737 of Jones et al. or applications Serial Nos. 273,738 and 273,739 of Jones, all filed February 27, 1952, and assigned to the same assignee as the present application, now Patents Nos. 2,720,975, 2,720,976, and 2,720,977, respectively, all dated October 18, 1955, are provided in walls 11 and 12, the various outlets in any one of the two walls being, if desired, interconnected by a header 32, as shown in Figure 3.

The embodiment illustrated in Figure 4 is substantially similar to that illustrated in Figures 1 to 3, the only differences being that the separation chamber 10a is not provided with a liquid-permeable membrane 14, only one gasket 16a is required, and the inlets 27a terminate within the separation chamber 10a substantially midway between the opposed walls 11 and 12 and are flared at the ends to further reduce the velocity of flow therethrough.

The embodiment shown in Figure 5 illustrates the manner in which one or more of the outlets in the apparatus, shown in Figures 1 to 4, may conveniently be neutralized if such outlets are not to be used in a particular operation. Thus, for example, the outlets 31a and 31b of Figure 4 could be left open and the remaining outlets can be effectively blocked or neutralized by insertion of closures indicated by reference numeral 34.

When a membrane is employed in apparatus such as that illustrated in Figures 1 to 3, it must be permeable and reasonably inert with respect to, and unaffected as to permeability by, all components of the liquid mixture to be subjected to continuous thermal diffusion. It may be supported, if necessary to avoid complete or partial blocking of the portion of the separation chamber between the membrane and an adjacent wall, against lateral displacement by spacers or the like such as are described in application Serial No. 271,182 of Jones and Milberger, filed February 12, 1952, and assigned to the same assignee as this application. Papers such as duplicator paper, 16- and 24-lb. bond paper, and tracing paper have been found quite suitable as membrane material. Films of bentonite clay, thin sheets of porous stainless steel, and a laminate of fiber glass material impregnated with a finely divided filler such as clay have also been found suitable.

In operation, one of the walls 11 and 12 are relatively heated and the other relatively cooled, e. g., by circulating steam through jacket 19 by way of lines 21 and 22 and by circulating cooling water through the jacket 20 by way of lines 24 and 26. The liquid mixture to be subjected to thermal diffusion is continuously introduced into the separation chamber 10 or 10a by way of header 29, branch lines 30 and inlets 27 or 27a. The temperature gradient across the separation chamber results in the accumulation of a liquid fraction enriched in one or more of the components adjacent one of the chamber-forming walls and in the accumulation of another liquid fraction impoverished in said component or components adjacent the other chamber-forming wall. These fractions are separately and continuously withdrawn from adjacent the respective walls by way of outlets 31 or through outlets 31a and 31b if the remaining outlets are neutralized, as indicated in Figure 5.

The term "components" as used in the description of the invention is intended to refer to materials in a liquid or dissolved state. Examples of liquid mixtures susceptible to separation into dissimilar liquid fractions by thermal diffusion are lubricating oils containing components having different viscosity indices, mixtures or solutions of isomeric hydrocarbons, fatty oils containing glyceride esters of fatty acids of different molecular weights and separation, liquid mixtures and solutions of hormones, viruses, antibiotics, etc., azeotropic mixtures such as mixtures of benzyl alcohol and ethylene glycol, fish oil containing active vitamin components and components having no vitamin activity, and the like. The difference between the components in a liquid mixture that are capable of separation in the method and apparatus of the invention may be extremely minute. Thus, for example, they may have the same empirical formula but differ slightly in structure or molecular weight.

It is evident that many modifications in the apparatus and method forming the subject matter of this invention will become apparent to those skilled in the art upon reading this description. It is to be understood that all such modifications are intended to be included within the scope of the invention as defined in the accompanying claims.

I claim:

1. Liquid thermal diffusion apparatus comprising an elongated separation chamber formed by closely spaced, substantially parallel, liquid-impervious, opposed walls, means for relatively heating one of said walls and cooling the other of said walls to maintain a temperature gradient across the separation chamber, an inlet for introducing a liquid mixture into the chamber, said inlet extending into said chamber and terminating intermediate the chamber-forming walls, and a plurality of outlets in and extending substantially across said opposed walls and spaced from said inlet for withdrawing liquid fractions from said separation chamber at locations closely adjacent the chamber-forming walls.

2. Liquid thermal diffusion apparatus comprising an elongated separation chamber formed by closely spaced, substantially parallel, liquid-impervious, opposed walls, means for relatively heating one of said walls and cooling the other of said walls to maintain a temperature gradient across the separation chamber, a plurality of spaced inlets for introducing a liquid mixture into the chamber, said inlets extending into said chamber and terminating at locations intermediate the chamber-forming walls, and a plurality of outlets in and extending substantially across said opposed walls and spaced from said inlets for withdrawing liquid fractions from said separation chamber at locations closely adjacent the chamber-forming walls.

3. Liquid thermal diffusion apparatus comprising an elongated separation chamber formed by closely spaced, substantially parallel, liquid-impervious, opposed walls, means for relatively heating one of said walls and cooling the other of said walls to maintain a temperature gradient across the separation chamber, a liquid-permeable membrane intermediate and substantially parallel to the chamber-forming walls and extending longitudinally through said chamber, a plurality of spaced inlets for introducing a liquid mixture into the chamber, said inlets extending into said chamber and terminating within the chamber at locations closer to the membrane than to either of the chamber-forming walls, and a plurality of outlets spaced from said inlets for withdrawing liquid fractions from said separation chamber at locations closely adjacent the chamber-forming walls.

4. Liquid thermal diffusion apparatus comprising an elongated separation chamber formed by closely spaced, substantially parallel, liquid-impervious, opposed walls, means for relatively heating one of said walls and cooling the other of said walls to maintain a temperature gradient across the separation chamber, a liquid-permeable membrane intermediate and substantially parallel to the chamber-forming walls and extending longitudinally through said chamber, a plurality of spaced inlets for introducing a liquid mixture into the chamber, said inlets extending into said chamber and terminating within the chamber at locations closer to the membrane than to either of the chamber-forming walls, a plurality of outlets spaced from said inlets for withdrawing a liquid fraction from the separation chamber at locations closely adjacent one of the chamber-forming walls, and a plurality of outlets spaced from said inlets for withdrawing another liquid fraction from the separation chamber at locations closely adjacent the other of the chamber-forming walls.

5. In a method for separating dissimilar materials in a liquid mixture by continuous liquid thermal diffusion in a separation chamber formed by closely spaced, substantially parallel, liquid-impervious, opposed walls, one of which is maintained at a higher temperature than the other, the improvement which comprises continuously introducing the liquid mixture into the separation chamber at spaced locations intermediate the chamber-forming walls; continuously withdrawing, at locations spaced from the locations of introduction, a first liquid fraction from adjacent one of the chamber-forming walls; and continuously withdrawing, at locations likewise spaced from the locations of introduction, a second liquid fraction from adjacent the other of the chamber-forming walls.

6. In a method for separating dissimilar materials in a liquid mixture by continuous liquid thermal diffusion in a separation chamber formed by closely spaced, substantially parallel, liquid-impervious, opposed walls, one of which is maintained at a higher temperature than the other, said chamber having a liquid-permeable membrane intermediate and substantially parallel to the chamber-forming walls and extending longitudinally through the chamber, the improvement which comprises introducing the liquid mixture into the separation chamber at locations closer to the permeable membrane than to the chamber-forming walls; withdrawing, at locations spaced from the locations of introduction, a first liquid fraction from adjacent one of the chamber-forming walls; and withdrawing, at locations likewise spaced from the locations of introduction, a second liquid fraction from adjacent the other of the chamber-forming walls.

References Cited in the file of this patent
UNITED STATES PATENTS

| | | |
|---|---|---|
| 2,158,238 | Hvid | May 16, 1939 |
| 2,258,594 | Brewer et al. | Oct. 14, 1941 |
| 2,474,007 | Maycock | June 21, 1949 |
| 2,541,069 | Jones et al. | Feb. 13, 1951 |
| 2,585,244 | Hanson | Feb. 12, 1952 |